(12) United States Patent
Xiao et al.

(10) Patent No.: US 9,029,230 B2
(45) Date of Patent: May 12, 2015

(54) CONDUCTIVE LINE ROUTING FOR MULTI-PATTERNING TECHNOLOGY

(71) Applicant: Taiwan Semiconductor Manufacturing Co., Ltd., Hsin-Chu (TW)

(72) Inventors: You-Cheng Xiao, Taiping (TW); Wei Min Chan, Sindian (TW); Ken-Hsien Hsieh, Taipei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 13/755,326

(22) Filed: Jan. 31, 2013

(65) Prior Publication Data

US 2014/0210100 A1    Jul. 31, 2014

(51) Int. Cl.
*H01L 21/20* (2006.01)
*H01L 21/768* (2006.01)
*G06F 17/50* (2006.01)
*H01L 23/48* (2006.01)

(52) U.S. Cl.
CPC ...... *H01L 21/76838* (2013.01); *G06F 17/5077* (2013.01); *H01L 23/481* (2013.01); *H01L 2924/0002* (2013.01); *G06F 2217/78* (2013.01)

(58) Field of Classification Search
None
See application file for complete search history.

(56) References Cited

U.S. PATENT DOCUMENTS

| 7,307,298 B2* | 12/2007 | Yamane et al. | 257/280 |
| 2005/0269647 A1* | 12/2005 | Briere | 257/401 |
| 2012/0235240 A1* | 9/2012 | Dixit | 257/351 |

* cited by examiner

*Primary Examiner* — Zandra Smith
*Assistant Examiner* — Andre' C Stevenson
(74) *Attorney, Agent, or Firm* — Duane Morris LLP; Steven E. Koffs (57) ABSTRACT

A method comprises: forming a plurality of reference voltage patterns in a first layer of a semiconductor substrate using a first mask, the reference voltage patterns including alternating first reference voltage patterns and second reference voltage patterns; and forming a plurality of signal patterns in the first layer of the semiconductor substrate using a second mask, ones of the plurality of signal patterns located between successive pairs of reference voltage patterns.

20 Claims, 7 Drawing Sheets

CONDUCTIVE LINE ROUTING FOR MULTI-PATTERNING TECHNOLOGY

FIELD

This disclosure relates generally to integrated circuits (ICs), and more specifically to methods and automated tools for designing layouts for multi-patterning.

BACKGROUND

In semiconductor fabrication processes, the resolution of a photoresist pattern begins to blur at about 45 nanometer (nm) half pitch. To continue to use fabrication equipment purchased for larger technology nodes, multi-exposure methods have been developed.

Multiple exposure or multi-patterning technology (MPT) involves forming patterns on a single layer of a substrate using two or more different masks in succession. As long as the patterns within each individual mask comply with the relevant minimum separation distances for the technology node, the combination of patterns formed using the plural masks may include smaller spacings than the minimum separation distance. MPT allows line segments, and in some cases, vertices (angles) to be formed of a vertical segment and a horizontal segment on the same mask. Thus, MPT provides flexibility and generally allows for significant reduction in overall IC layout.

MPT is a layout splitting method analogous to an M-coloring problem for layout splitting in graph theory, where M is the number of masks used to expose a single layer (and the number of exposures). For example, if two masks are to be used (double patterning technology, DPT), it is customary to refer to the patterns as being assigned one of two "color types", where the color corresponds to a photomask assignment. As used herein, DPT is an example of MPT, so that generic references to MPT include DPT as one non-limiting example.

If there is any misalignment between the masks used to pattern the same layer, the result will be variations in coupling capacitances between the circuit patterns formed by different masks, which in turn affects both the couplings and the total capacitances of the nets.

DETAILED DESCRIPTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation.

Misalignment of two masks used to pattern the same layer in multi-patterning (e.g., two photo, two etch or 2P2E) technology would induce RC variation, especially for coupling capacitance. Further, the misalignment of via landings on metal lines could cause metal bridging and yield loss.

In order to control such variation for critical signals, a mechanism described below pre-defines signals in the same mask during the layout stage before tape-out.

This technique provides a general solution to (1) prevent via-induced metal bridging due to via misalignment and (2) eliminate manual effort of pre-coloring (i.e., manually assigning circuit patterns to specific masks) to automatically specify which signals should be defined in the same mask. The method provides a routing style for 2P2E technology to ensure that a group signals can be defined in the same mask.

Figure 1:
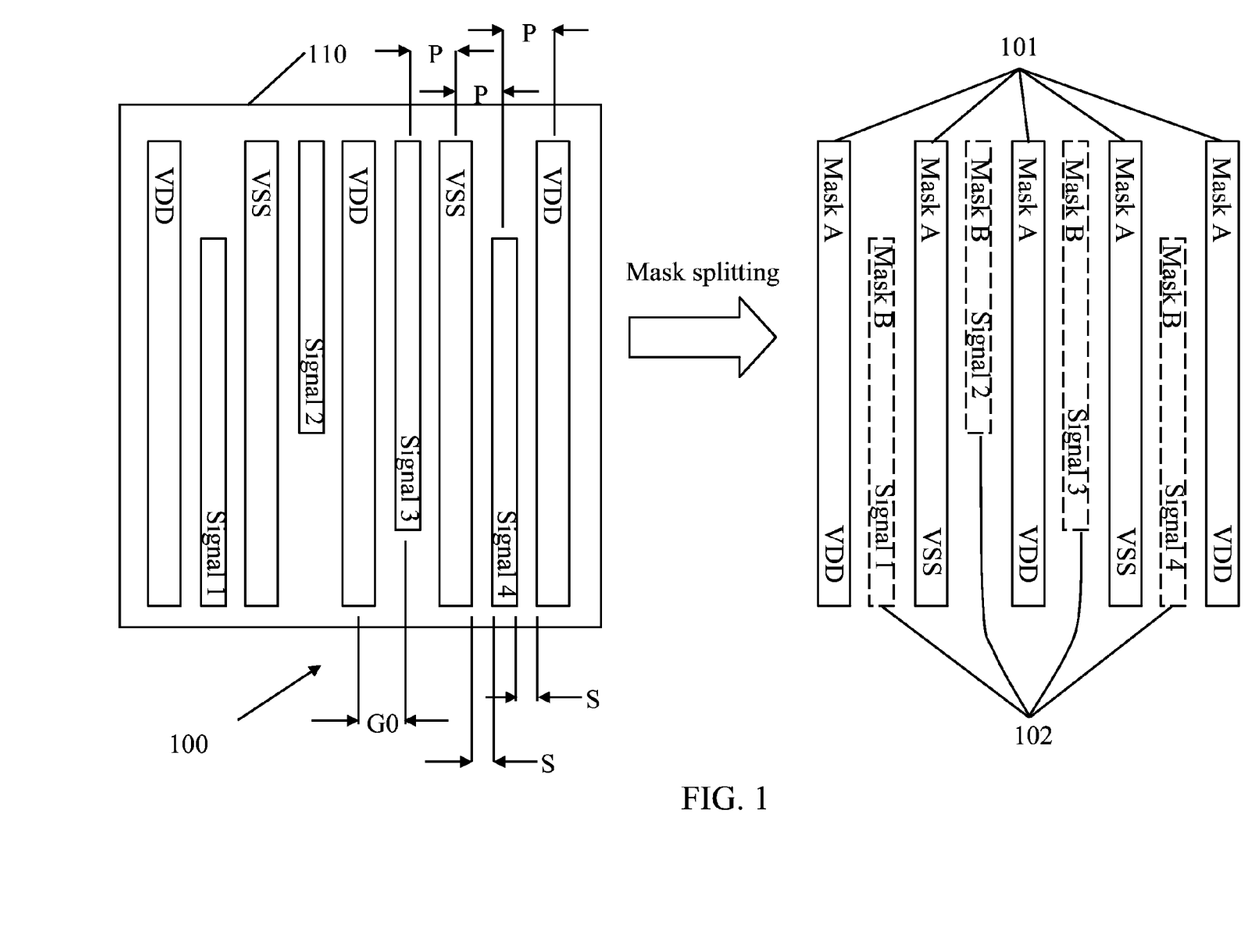
FIG. 1 is a diagram showing double patterning decomposition of an IC layer into two sets of patterns to be formed by respective photomasks.

FIG. 1 is a diagram of a layout 100 of a layer of a semiconductor structure, and its decomposition into two masks ("Mask A" and "Mask B").

The semiconductor structure 100 comprises a semiconductor substrate 110. A plurality of reference voltage patterns (VDD and VSS) are provided in a first layer of the semiconductor substrate 110. The reference voltage patterns include alternating first reference voltage (VDD) patterns and second reference voltage (VSS) patterns to be connected to respective first and second reference voltages VDD and VSS. A plurality of signal patterns (Signal 1, Signal 2, Signal 3, Signal 4) are provided in the first layer of the semiconductor substrate 110. Ones of the plurality of signal patterns are located between successive pairs of reference voltage patterns VDD, VSS. In some embodiments, the layout is arranged with the sequence of one power track (VDD or VSS) followed by one adjacent signal track, repeated regularly. The power mesh can be automatically defined together in one mask (e.g. Mask A). The signal conductive tracks can be automatically defined together in the other mask (e.g., Mask B). In some embodiments, this arrangement can include any number of repetitions of the sequence VDD-signal-VSS-signal, plus a final VDD pattern.

In some embodiments, each one of the plurality of reference voltage patterns VDD, VSS is separated from a nearest one of the plurality of signal patterns by a distance S, which is substantially smaller than a minimum distance (G0) for forming clear patterns in a single-photo, single-etch process (See FIG. 1). Thus, the layout is a candidate for MPT (for example, DPT).

As shown in FIG. 1, following the mask splitting (double patterning decomposition), the power tracks, including VDD and VSS patterns 101 are assigned to Mask A, as indicated by solid outlines. The signal patterns 102 are to be formed by Mask B, as indicated by dashed lines.

Figure 2A:
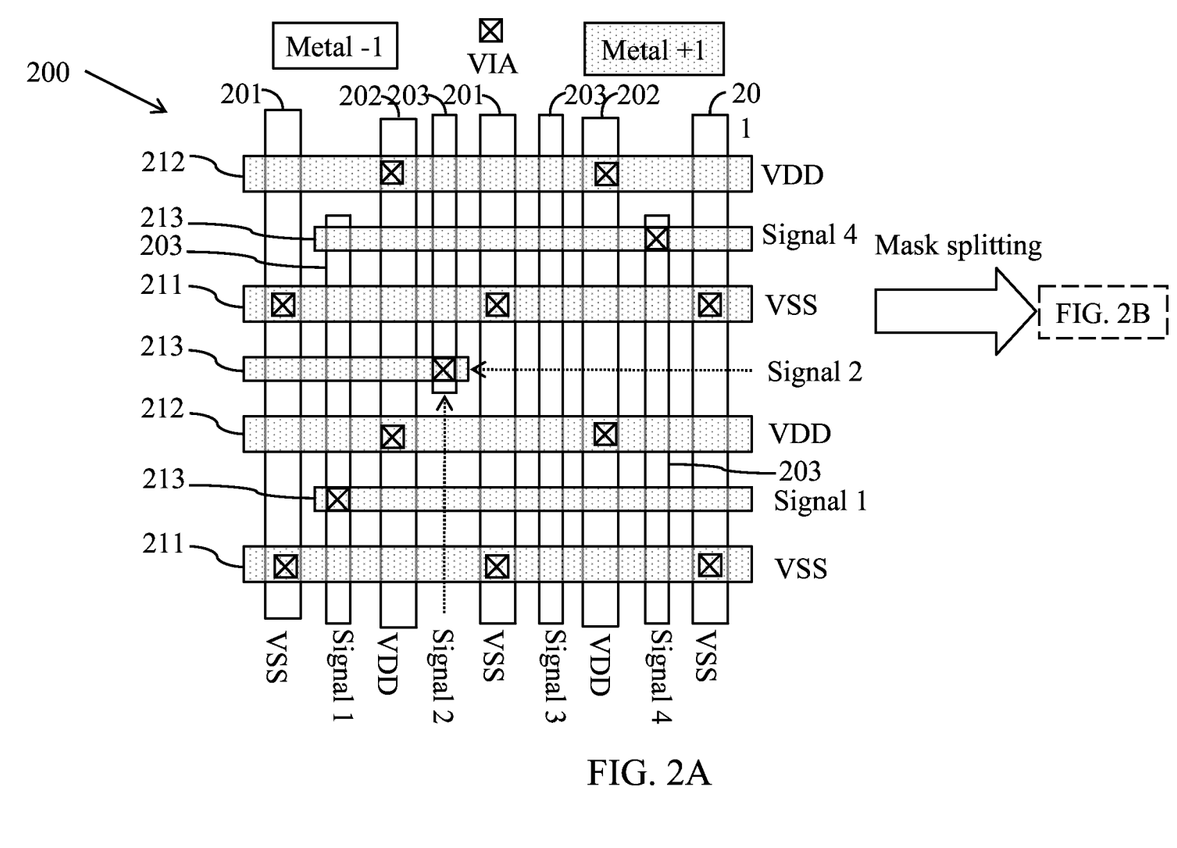
FIGS. 2A and 2B show double patterning decomposition of two successive conductive line layers and the via layer therebetween into plural sets of patterns to be formed by double patterning.
Figure 2B:
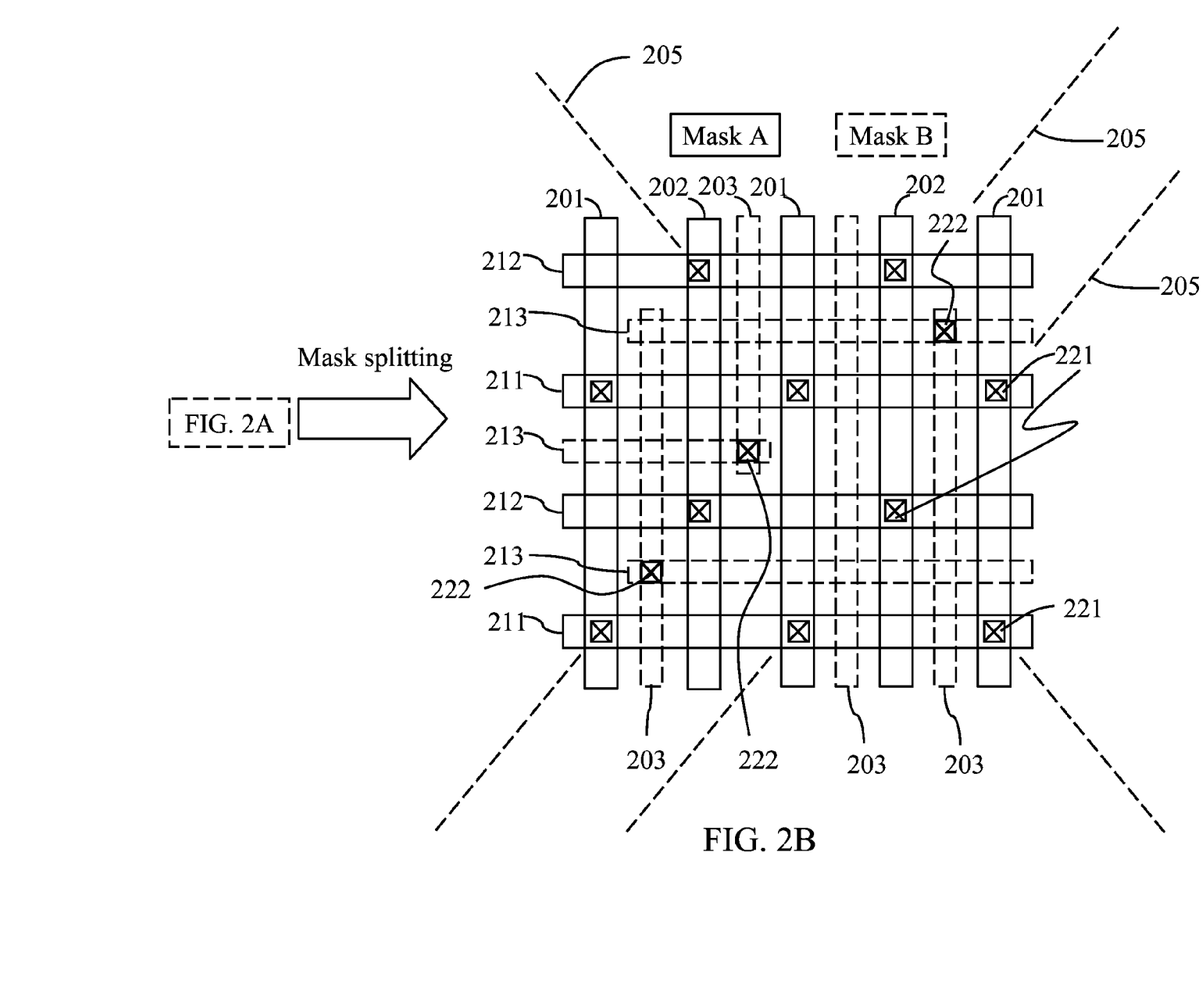

FIGS. 2A and 2B show two layers of an IC. These layers can be, but are not limited to, any two or more consecutive conductive line layers of an interconnect structure (e.g., the M1 layer and the M2 layer). In some embodiments, the conductive line layers include copper or polycrystalline silicon conductive lines formed by a damascene process. Other conductive line materials can be used. For ease of viewing, the first layer patterns are shown unshaded (white), and the second layer patterns are shown shaded.

A plurality of reference voltage patterns (VSS 201 and VDD 202) are provided in the first layer of the semiconductor substrate. The reference voltage patterns include alternating first reference voltage (VSS) patterns 201 and second reference voltage (VDD) patterns 202 to be connected to respective first and second reference voltages VSS and VDD. A plurality of signal patterns 203 are provided in the first layer of the semiconductor substrate. The individual signal patterns 203 are located between successive pairs of reference voltage patterns VSS 201 and VDD 202. In some embodiments, the reference voltage patterns 201, 202 are wider than the signal patterns.

Depending on the process used to double pattern the substrate, and the order in which the two masks are used, the patterns formed by the first mask may form trenches in the inter-layer dielectric material which are deeper than the patterns formed by the second mask. These trenches are subsequently filled with conductive material (e.g., copper or polycrystalline silicon). Thus in some embodiments, the reference voltage (VDD and VSS) conductors are thicker than the signal conductors. In other embodiments, the signal conductors are thicker than the VDD and VSS conductors.

As shown by the shaded polygons, the substrate includes a further plurality of reference voltage patterns, in a second layer of the semiconductor substrate. The further plurality of reference voltage patterns including alternating first reference voltage patterns VSS 211 and second reference voltage patterns VDD 212. A further plurality of signal patterns 213 are provided in the second layer of the semiconductor substrate, between successive pairs of reference voltage patterns 211 and 212.

The respective first and second reference voltage patterns 211, 212 of the second layer are connected to the respective first and second reference voltage patterns 201, 202 of the first layer by conductive vias. The respective signal patterns 213 of the second layer are connected to respective signal patterns 203 of the first layer by conductive vias.

In the example of FIGS. 2A and 2B, the plurality of circuit patterns 201, 202, 203 of the first layer are oriented in one of a horizontal and a vertical direction, and the plurality of circuit patterns 211, 212 and 213 of the second layer are oriented in the other of the horizontal and vertical directions. The circuit patterns 201, 202, 203 in the first layer and 211, 212 and 213 in the second layer are arranged with a constant pitch P (center-to-center distance) between adjacent lines, as shown in FIG. 1. This arrangement facilitates the automatic of "checker-board routing" arrangement, in which vias are located along diagonals which pass through the intersections where the vertical circuit patterns of one layer cross over or under the horizontal circuit patterns of the adjacent layer.

Referring again to FIGS. 2A and 2B, the via layer is interposed between the first and second layers. The via layer comprising a first plurality of vias 221, for connecting the first reference voltage patterns 201 and 211 in the first and second layers to each other, and for connecting the second reference voltage patterns 202 and 212 in the first and second layers to each other, so that the vias 221 are aligned along a plurality of straight diagonal lines passing through points where patterns of the second layer pass over patterns of the first layer. The via layer further comprises a second plurality of vias 222, for connecting signal lines 203 of the first layer to signal lines 213 of the second layer. The second plurality of vias 222 are positioned diagonally between ones of the first plurality of vias 221.

By using one mask (e.g., mask A) for all VSS and VDD patterns, and one mask for all vias connected to the VSS and VDD patterns, overlay (misalignment) errors are avoided. Similarly, by using one mask (e.g., mask B) for all signal patterns, and one mask for all vias connected to the signal patterns, overlay (misalignment) errors are avoided.

In some embodiments, the reference voltage patterns 201, 202, 211, 212 and signal patterns 203, 213 are optionally arranged with a constant pitch P (FIG. 1) between adjacent patterns. In such a configuration, the intersections where the voltage reference patterns 211, 212 pass over the voltage patterns 201, 202 all lie along a square grid, and lie along one or more 45 degree diagonal lines 205. For clarity and ease of viewing, portions of the lines 205 overlapping with the circuit patterns are omitted from FIG. 2B. Although FIG. 2B shows only a subset of the line crossings having vias, in various embodiments, any or all circuit paths which are to be connected can include vias, so that any of the nodes on the "checker-board" can be occupied by a via.

In some embodiments, the reference voltage patterns 201, 202, 211, 212 have a first line width and the signal patterns 203, 213 have a second line width narrower than the first line width. In the examples shown, because plural reference voltage (e.g., VDD, VSS) lines are provided, each reference voltage line can have a relatively smaller width than configurations (not shown) with a single VDD and single VSS bus path, while still carrying the same total current. Thus, the VSS and VDD patterns can be sized wide enough for one via in the width direction. The VDD and VSS lines do not need to be wide enough to accommodate two vias (or rows of vias) in the width direction.

The arrangement described herein automatically aligns the vias 221 with the reference voltage patterns 201, 202, 211, 212 of the conductive line layers, and automatically aligns the vias 222 with the signal patterns 203, 213 of the conductive line layers. The arrangement can be used to assign important or same-function lines into the same mask to avoid overlay error and/or performance loss.

Some embodiments combine regular pitch of both power and signal routing tracks, interleaving of power and signal routing tracks, fine-grained power routing, automatic mask splitting for power and signals, and use of the same mask for metal lines and vias of the same net.

This configuration is useful for a variety of IC's. For example, a circuit having a large amount of repeated structures (e.g., a static random access memory, SRAM).

Figure 3:
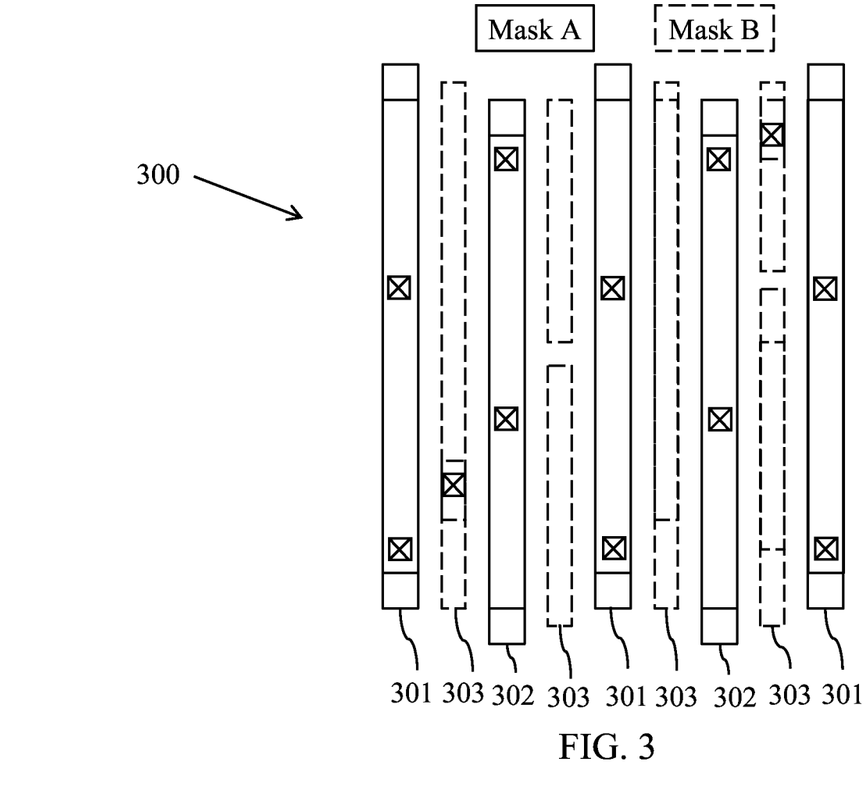
FIG. 3 is a diagram showing double patterning decomposition of a unidirectional IC layer into two sets of patterns to be formed by respective photomasks.

FIG. 3 shows an embodiment with unidirectional conductive line layer 300. A plurality of reference voltage patterns (VSS 301 and VDD 302) are provided in the first layer of the semiconductor substrate. The reference voltage patterns include alternating first reference voltage (VSS) patterns 301 and second reference voltage (VDD) patterns 302 to be connected to respective first and second reference voltages VSS and VDD. A plurality of signal patterns 303 are provided in the first layer of the semiconductor substrate. The individual signal patterns 303 are located between successive pairs of reference voltage patterns VSS 301 and VDD 302. In some embodiments, the reference voltage patterns 301, 302 are wider than the signal patterns.

Although FIG. 3 shows a unidirectional metal layer, the method can be used for bi-directional layers, where the vias are formed in a portion of each layer having the alternating voltage reference and signal lines, and within the voltage reference lines, VDD and VSS alternate with each other.

Although examples are provided in which one or two layers are double patterned, the structure can include any desired number of layers.

Although examples are provided using two masks per layer for double patterning, other embodiments use more than two masks per layer for other types of multi-patterning (e.g., triple patterning technology, quadruple patterning technology, or the like).

Figure 4:
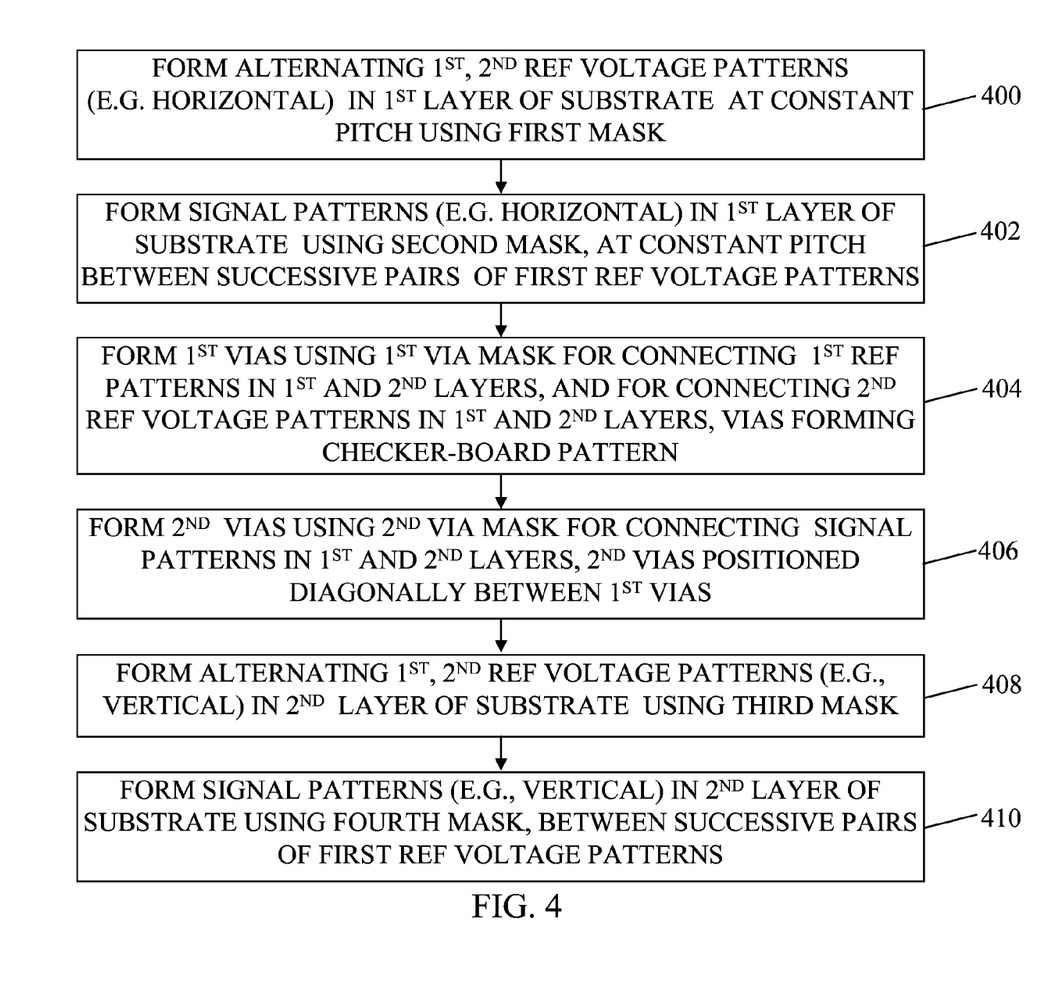
FIG. 4 is a flow chart of a process for double patterning a semiconductor substrate.

FIG. 4 is a flow chart of a method for multi-patterning (e.g., double patterning) layers of an IC having a circuit, such as an SRAM.

At step 400, a plurality of reference voltage patterns are formed in a first conductive line layer of a semiconductor substrate using a first mask. The reference voltage patterns include alternating first reference voltage patterns and second reference voltage patterns. The first layer is not limited to the M0 or M1 layer, but can refer to any conductive line layer.

At step 402, a plurality of signal patterns are formed in the first layer of the semiconductor substrate using a second mask. Ones of the plurality of signal patterns are located between successive pairs of reference voltage patterns. The reference voltage patterns and signal patterns are arranged with a constant pitch between adjacent patterns.

At step 404, a first plurality of vias are formed using a first via mask, for connecting the first reference voltage patterns in the first and second layers to each other, and for connecting the second reference voltage patterns in the first and second layers to each other. The vias are located so that the vias are aligned along a plurality of straight diagonal lines passing through points where patterns of the second layer pass over patterns of the first layer.

At step 406, a second plurality of vias are formed in the via layer using a second mask, for connecting signal lines of the first layer to signal lines of the second layer. The second plurality of vias are positioned diagonally between ones of the first plurality of vias.

At step 408, a further plurality of reference voltage patterns are formed in a second layer of the semiconductor substrate using a third mask. The further plurality of reference voltage patterns include alternating first reference voltage patterns and second reference voltage patterns connected to the respective first and second reference voltage patterns of the first layer. The reference voltage patterns and signal patterns are arranged with a constant pitch between adjacent patterns. The plurality of circuit patterns of the first layer are oriented in one of a horizontal and a vertical direction, and the plurality of circuit patterns of the second layer are oriented in the other of the horizontal and vertical directions.

At step 410, a further plurality of signal patterns are formed in the second layer of the semiconductor substrate, between successive pairs of reference voltage patterns using a fourth mask, the signal patterns of the second layer connected to the signal patterns of the first layer. The plurality of signal patterns of the first layer are oriented in one of a horizontal and a vertical direction, and the plurality of signal patterns of the second layer are oriented in the other of the horizontal and vertical directions.

Figure 5:
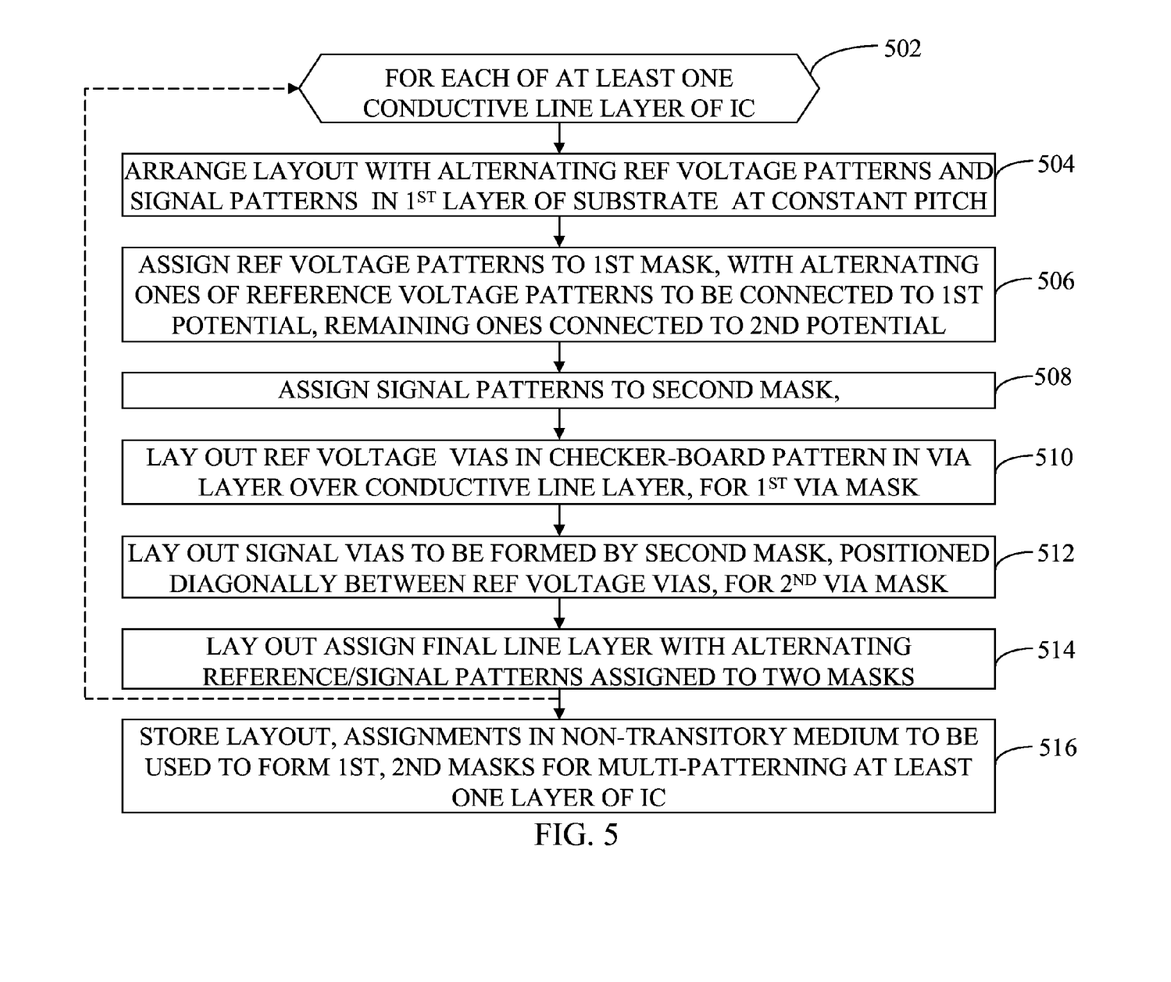
FIG. 5 is a flow chart of a method for generating a layout for double patterning a semiconductor substrate.

FIG. 5 is a flow chart of a method of generating a layout for generating photomasks used to double pattern layers of an IC, where the IC has a circuit, such as an SRAM.

At step 502, a loop including steps 504-512 is performed for each of at least one conductive line layer of the IC.

At step 504, a layout of at least one layer of an integrated circuit (IC) having a plurality of circuit patterns is arranged, so that the plurality of circuit patterns include alternating reference voltage patterns and signal patterns.

At step 506, the plurality of reference voltage patterns are assigned to a first mask, with alternating ones of the plurality of reference voltage patterns to be connected to a first voltage potential, and remaining ones of the plurality of reference voltage patterns to be connected to a second voltage potential.

At step 508, the plurality of signal patterns are assigned to a second mask. The reference voltage patterns and signal patterns are arranged with a constant pitch between adjacent patterns.

At step 510, a via layer is laid out, to be located between the first layer and the second layer. The first plurality of vias of the via layer are assigned to be formed by a first via mask. The first plurality of vias are located for connecting the first reference voltage patterns (to be connected to the first voltage potential) to each other, and for connecting the second reference voltage patterns (to be connected to the second voltage potential) to each other, so that the first plurality of vias form a checker-board pattern.

At step 512, a second plurality of vias are laid out for connecting signal lines of the first layer to signal lines of the second layer. The second plurality of vias are assigned to be formed by a second mask and positioned diagonally between ones of the first plurality of vias.

If a third conductive line layer and second via layer and are to be laid out and assigned to masks using the method, the loop of steps 504-512 is repeated. Similarly, the loop can be repeated for a fourth conductive line layer and third via layer, and so on.

At step 514, for the final conductive line layer assigned by the method, the second conductive line layer is laid out and assigned to photomasks in the same manner as done in steps 504-508. The plurality of circuit patterns of the first layer oriented in one of a horizontal and a vertical direction, the plurality of circuit patterns of the second layer oriented in the other of the horizontal and vertical directions.

At step 516, the layout and mask assignments are stored in a non-transitory machine readable storage medium to be used to form the first and second mask for multi-patterning the at least one layer of the IC.

Figure 6:
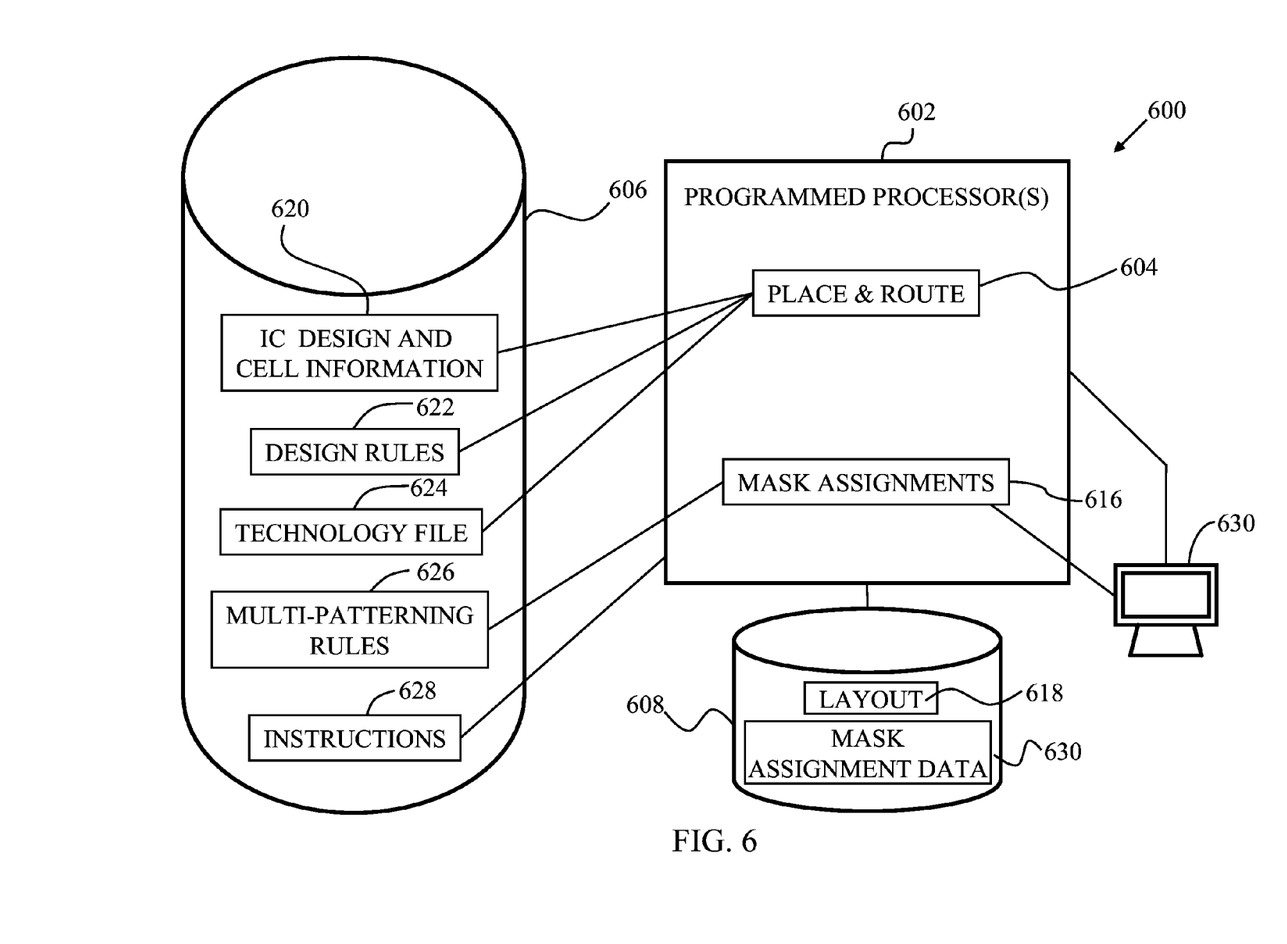
FIG. 6 is a block diagram of a system for generating a layout for double patterning a semiconductor substrate.

FIG. 6 is a block diagram of an exemplary system for generating the layout and assigning circuit patterns to respective masks according to one embodiment. System 600 includes at least one non-transitory, computer readable storage medium 608 for storing data representing a layout 618 of a layer of an integrated circuit (IC) comprising a plurality of polygons defining circuit patterns to be divided among a number (N) of photomasks for multi-patterning (e.g. double patterning, triple patterning, or the like) a single layer of a semiconductor substrate, where N is greater than one. Either the same storage medium 608 or a different storage medium 606 stores data and instructions used by the EDA tool 602. These include, but are not limited to IC design and cell information 620, design rules 622, technology file 624, additional multi-patterning design rules 626, and software program instructions 628.

System 600 includes an electronic design automation ("EDA") tool 602 such as "IC COMPILER"™, sold by Synopsys, Inc. of Mountain View, Calif., which may include a place and route tool 304, such as "ZROUTE"™, also sold by Synopsys. Other EDA tools 602 may be used, such as the "VIRTUOSO" custom design platform or the Cadence "ENCOUNTER"® digital IC design platform may be used, along with the "VIRTUOSO" chip assembly router 604, all sold by Cadence Design Systems, Inc. of San Jose, Calif. Alternatively, Calibre, by Mentor Graphics of Wilsonville, Oreg. can be used. Alternatively, the Laker custom design platform by SpringSoft USA of San Jose, Calif. can be used.

The technology file 624 and design rules 626 are configured to implement the placement of reference voltage (VDD, VSS) conductive line patterns and signal patterns described herein.

EDA tool 602 is a special purpose computer formed by retrieving stored program instructions from a non-transient computer readable storage medium 606, 608 and executing the instructions on a general purpose processor. Examples of non-transient computer readable storage mediums 606, 608 include, but are not limited to, hard disk drives (HDD), read only memories ("ROMs"), random access memories ("RAMs"), flash memories, or the like. Tangible, non-transient machine readable storage mediums 606, 608 are configured to store data generated by the place and route tool 604.

The router of the place and route tool 604 is capable of receiving an identification of a plurality of cells to be included in an integrated circuit ("IC") or interposer layout, including a netlist containing pairs of cells within the plurality of cells to be connected to each other. Router 604 may be equipped with a set of default design rules 622 and tech file 624. Router 604 generates the custom interconnect routing lines and vias for interconnecting the various devices of the IC.

The mask assignment module 616 applies the MPT rules 626 and determines the assignment of each remaining circuit pattern to one of the two remaining photomasks. Module 612 assigns the circuit patterns within each group to a respective mask to provide mask assignment data, for forming each group of circuit patterns on or in the single layer of the IC. The assignments alternate between the two masks.

The mask assignment module 616 outputs the mask assignment data 630 to the non-transitory machine readable storage medium 608 for use by a verification or photomask fabrication process.

Block 602 indicates that one or more programmed processors may be included. In some embodiments, the processing load is performed by two or more application programs, each operating on a separate processor. In other embodiments, the processes are all performed using one processor. Similarly, two media 606 and 608 are shown, but the data may be stored in any number of media.

Although FIG. 6 shows an allocation of the various tasks to specific modules, this is only one example. The various tasks may be assigned to different modules to improve performance, or improve the ease of programming.

The "checker-board conductive line routing described herein can generally provide one power track accompanied by one signal track, repeated regularly. Power lines and VIAs can be defined in one mask (ex. Mask A). Signal lines and VIAs can be defined in the other mask (ex. Mask B). The method provides automatic mask splitting for power and signal lines; automatic via pre-coloring (mask assignments); no misalignment issue between via and metal lines, preventing via-induced metal bridging; regular and fine-grained power routing; and a greater chance to pass DPT standards (e.g., the minimum spacing between adjacent patterns for clear patterning by a single mask) of mask splitting before layout fix.

In some embodiments, a method comprises: forming a plurality of reference voltage patterns in a first layer of a semiconductor substrate using a first mask, the reference voltage patterns including alternating first reference voltage patterns and second reference voltage patterns; and forming a plurality of signal patterns in the first layer of the semiconductor substrate using a second mask, ones of the plurality of signal patterns located between successive pairs of reference voltage patterns.

In some embodiments, a semiconductor structure comprises a semiconductor substrate. A plurality of reference voltage patterns are provided in a first layer of the semiconductor substrate. The reference voltage patterns include alternating first reference voltage patterns and second reference voltage patterns to be connected to respective first and second reference voltages. A plurality of signal patterns are provided in the first layer of the semiconductor substrate. Ones of the plurality of signal patterns located between successive pairs of reference voltage patterns. Each one of the plurality of reference voltage patterns is separated from a nearest one of the plurality of signal patterns by a distance substantially smaller than a minimum distance for forming clear patterns in a single-photo, single-etch process.

In some embodiments, a method comprises: arranging a layout of at least one layer of an integrated circuit (IC) having a plurality of circuit patterns, the plurality of circuit patterns including alternating reference voltage patterns and signal patterns; assigning the plurality of reference voltage patterns to a first mask, with alternating ones of the plurality of reference voltage patterns to be connected to a first voltage potential, and remaining ones of the plurality of reference voltage patterns to be connected to a second voltage potential; assigning the plurality of signal patterns to a second mask; and storing the layout in a non-transitory machine readable storage medium to be used to form the first and second mask for multi-patterning the at least one layer of the IC.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A method, comprising:
   forming a plurality of reference voltage patterns in a first layer of a semiconductor substrate using a first mask, the reference voltage patterns including alternating first reference voltage patterns and second reference voltage patterns;
   forming a plurality of signal patterns in the first layer of the semiconductor substrate using a second mask, ones of the plurality of signal patterns located between successive pairs of reference voltage patterns;
   forming a further plurality of reference voltage patterns in a second layer of the semiconductor substrate using a third mask, and
   forming a further plurality of signal patterns in the second layer of the semiconductor substrate, between successive pairs of reference voltage patterns using a fourth mask, the signal patterns of the second layer connected to the signal patterns of the first layer.

2. The method of claim 1, wherein:
the further plurality of reference voltage patterns include alternating first reference voltage patterns and second reference voltage patterns connected to the respective first and second reference voltage patterns of the first layer.

3. The method of claim 2, wherein the plurality of circuit patterns of the first layer are oriented in one of a horizontal and a vertical direction, and the plurality of circuit patterns of the second layer are oriented in the other of the horizontal and vertical directions.

4. The method of claim 2, further comprising:
forming a first plurality of vias using a first via mask, for connecting the first reference voltage patterns in the first and second layers to each other, and for connecting the second reference voltage patterns in the first and second layers to each other, so that the vias are aligned along a plurality of straight diagonal lines passing through points where patterns of the second layer pass over patterns of the first layer.

5. The method of claim 4, further comprising forming a second plurality of vias in the via layer using a second mask, for connecting signal lines of the first layer to signal lines of the second layer, the second plurality of vias positioned diagonally between ones of the first plurality of vias.

6. The method of claim 1, wherein the reference voltage patterns and signal patterns are arranged with a constant pitch between adjacent patterns.

7. The method of claim 1, wherein the plurality of circuit patterns are part of a static random access memory.

8. A method, comprising:
forming a first plurality of first reference voltage patterns in a first layer of a semiconductor substrate using a first mask;
forming a first plurality of signal patterns in the first layer of the semiconductor substrate using a second mask between successive ones of the first plurality of first reference voltage patterns;
forming a second plurality of first reference voltage patterns in a second layer of the semiconductor substrate using a third mask;
forming a first plurality of vias using a first via mask, for connecting the first reference voltage patterns in the first layer to the first reference voltage patterns in the second layer, so that the vias are aligned along a plurality of straight diagonal lines passing through points where first reference voltage patterns of the second layer cross over first reference voltage patterns of the first layer.

9. The method of claim 8 further comprising forming second reference voltage patterns between pairs of successive first reference voltage patterns in the first layer using the first mask.

10. The method of claim 9 further comprising forming second reference voltage patterns between pairs of successive first reference voltage patterns in the second layer using the third mask.

11. The method of claim 8, further comprising forming a second plurality of signal patterns in the second layer of the semiconductor substrate between successive ones of the second plurality of first reference voltage patterns using a fourth mask.

12. The method of claim 11, wherein the via layer further comprises a second plurality of vias, for connecting the first plurality of signal lines of the first layer to the second plurality of signal lines of the second layer, the second plurality of vias positioned diagonally between ones of the first plurality of vias.

13. The method of claim 8, wherein adjacent ones the first plurality of first reference voltage patterns and signal patterns of the first layer are arranged with a constant pitch therebetween.

14. The method of claim 8, wherein the first reference voltage patterns have a first line width and the signal patterns have a second line width narrower than the first line width.

15. The method of claim 8, wherein the plurality of signal patterns are part of a static random access memory.

16. A method, comprising:
forming a first reference voltage pattern and a second reference voltage pattern in a first layer of a semiconductor substrate using a first mask;
forming a signal pattern in the first layer of the semiconductor substrate using a second mask, the signal pattern located between the first reference voltage pattern and the second reference voltage pattern; and
forming a respective via on each of the first reference voltage pattern, the second reference voltage pattern, and the signal pattern, along a diagonal line relative to the reference voltage pattern, the second reference voltage pattern, and the signal pattern.

17. The method of claim 16, further comprising:
forming a first reference voltage pattern and a second reference voltage pattern in a second layer of the semiconductor substrate using a third mask;
forming a signal pattern in the second layer using a fourth mask, the signal pattern located between the first reference voltage pattern and the second reference voltage pattern in the second layer,
wherein a first one of the vias connects the first reference voltage patterns in the first and second layers, a second one of the vias connects the second reference voltage patterns in the first and second layers, and a third one of the vias connects the signal patterns in the first and second layers.

18. The method of claim 16, wherein a pitch between the first reference pattern of the first layer and the signal pattern of the first layer and a pitch between the second reference pattern of the first layer and the signal pattern of the first layer are the same as each other.

19. The method of claim 18, wherein a pitch between the first reference pattern of the second layer and the signal pattern of the second layer and a pitch between the second reference pattern of the second layer and the signal pattern of the second layer are the same as each other.

20. The method of claim 16, further comprising: forming a first reference voltage pattern and a second reference voltage pattern in a second layer of the semiconductor substrate using a third mask; forming a signal pattern in the second layer using a fourth mask, the signal pattern located between the first reference voltage pattern and the second reference voltage pattern in the second layer, wherein a first one of the vias connects the first reference voltage patterns in the first and second layers, a second one of the vias connects the second reference voltage patterns in the first and second layers, and a third one of the vias connects the signal patterns in the first and second layers; a pitch between the first reference pattern of the second layer and the signal pattern of the second layer and a pitch between the second reference pattern of the second layer and the signal pattern of the second layer are the same as each other; a pitch between the first reference pattern of the first layer and the signal pattern of the first layer and a pitch between the second reference pattern of the first layer and the signal pattern of the first layer are the same as each other; the first and second reference voltage patterns of the first and second layers have a first line width, and the signal patterns of the first and second layers have a second line width narrower than the first line width.

* * * * *